(12) United States Patent
Biester

(10) Patent No.: US 10,030,750 B2
(45) Date of Patent: Jul. 24, 2018

(54) DRIVE DEVICE

(71) Applicant: OneSubsea, LLC, Houston, TX (US)

(72) Inventor: Klaus Biester, Celle (DE)

(73) Assignee: ONESUBSEA IP LIMITED, London (GB)

( * ) Notice: Subject to any disclaimer, the term of this patent is extended or adjusted under 35 U.S.C. 154(b) by 1046 days.

(21) Appl. No.: 14/101,174

(22) Filed: Dec. 9, 2013

(65) Prior Publication Data

US 2014/0165781 A1    Jun. 19, 2014

Related U.S. Application Data

(62) Division of application No. 10/525,937, filed as application No. PCT/EP03/09696 on Sep. 1, 2003, now Pat. No. 8,621,958.

(30) Foreign Application Priority Data

Aug. 30, 2002    (DE) .............................. 202 13 364 U

(51) Int. Cl.
    *F16H 37/06*    (2006.01)
    *F16K 31/04*    (2006.01)
    (Continued)

(52) U.S. Cl.
    CPC ......... *F16H 37/065* (2013.01); *F16K 31/047* (2013.01); *H02K 7/06* (2013.01);
    (Continued)

(58) Field of Classification Search
    CPC ........ F16H 37/065; H02K 7/06; H02K 16/00; F16K 31/047
    (Continued)

(56) References Cited

U.S. PATENT DOCUMENTS

| 1,563,405 A | 12/1925 | Schlumberger |
| 2,734,396 A * | 2/1956 | Falk et al. .............. F16H 37/00 74/410 |
| 2,982,146 A * | 5/1961 | Stoeckicht ................ F16H 1/08 74/410 |
| 3,168,665 A | 2/1965 | Hopler |

(Continued)

FOREIGN PATENT DOCUMENTS

DE    3607899 A1    10/1987

OTHER PUBLICATIONS

International Search Report and Written Opinion dated Jan. 30, 2004 for PCT Application No. PCT/EP2003/009696 filed Sep. 1, 2003.

*Primary Examiner* — William C Joyce
(74) *Attorney, Agent, or Firm* — Chamberlain Hrdlicka

(57) ABSTRACT

A drive device serves for adjusting an operating element for a valve, a throttle, a blow-out preventor or the like, in particular in the field of gas and oil production, the operating element being actively connected to at least one driving motor via a drive train, and at least one transmission changing unit being arranged in the drive train for converting a revolution of the driving motor into a revolution of the operating element and/or a revolution/linear motion converter being arranged for converting the revolution of the driving motor into a linear motion of the operating element. In order to also have a very compact design in case of a high possible performance and to simultaneously permit a good thermal distribution within the drive device, so that separate cooling devices for carrying off the generated lost heat are superfluous, the drive train comprises at least one essentially disk- or wheel-shaped revolution introducing device which is actively connected with at least two drive shafts driven by separate driving motors.

7 Claims, 2 Drawing Sheets

(51) Int. Cl.
*H02K 7/06* (2006.01)
*H02K 16/00* (2006.01)

(52) U.S. Cl.
CPC ......... *H02K 16/00* (2013.01); *Y10T 74/18056* (2015.01); *Y10T 74/18576* (2015.01); *Y10T 74/18624* (2015.01); *Y10T 74/19051* (2015.01); *Y10T 74/19828* (2015.01)

(58) Field of Classification Search
USPC ................................ 74/611, 665 A; 310/112
See application file for complete search history.

(56) References Cited

U.S. PATENT DOCUMENTS

| | | | | |
|---|---|---|---|---|
| 3,481,215 | A * | 12/1969 | Howell | F16H 1/08 74/424.5 |
| 3,548,678 | A * | 12/1970 | Phillips | C21C 5/50 266/245 |
| 3,760,654 | A | 9/1973 | Fisher | |
| 3,998,108 | A | 12/1976 | Vyskocil | |
| 4,803,390 | A | 2/1989 | Bertram et al. | |
| 5,043,617 | A | 8/1991 | Rostron | |
| 5,370,011 | A | 12/1994 | Gilges et al. | |
| 5,522,278 | A * | 6/1996 | Panjuchin | B23F 21/00 209/48 |
| 5,838,135 | A * | 11/1998 | Satake | H02K 16/00 310/112 |
| 6,269,711 | B1 * | 8/2001 | Tejima | F16H 49/001 384/512 |
| 6,737,778 | B2 * | 5/2004 | Daikoku | H02K 7/1008 310/112 |

* cited by examiner

DRIVE DEVICE

STATEMENT REGARDING FEDERALLY SPONSORED RESEARCH OR DEVELOPMENT

Not applicable.

BACKGROUND OF THE INVENTION

The invention relates to a drive device for adjusting an operating element for a valve, a throttle, a blow-out preventer (BOP) or the like, in particular in the field of gas and oil exploitation and/or production, the operating element being actively connected to at least one driving motor via a drive train, and at least one transmission changing unit being arranged in the drive train for converting a revolution of the driving motor into a revolution of the operating element and/or a revolution/linear motion converter being arranged for converting the revolution of the driving motor into a linear motion of the operating element.

Such a drive device is known, for example, from the DE 200 18 561. The drive device serves for adjusting an isolating element as an operating element in a blow-out preventer (BOP). In the drive train for the linear adjustment of the operating element, for example, a worm gear pair is arranged as the transmission changing unit. A revolution generated by an electric driving motor is introduced into the drive train by a worm wheel and converted into a linear motion of the operating element by a ball screw as the revolution/linear motion converter.

Normally, for adjusting the operating element, great forces are necessary, so that a plurality of driving motors optionally having correspondingly large dimensions for offering the corresponding power are employed. Therefore, the drive device becomes relatively bulky and difficult to handle in particular in applications in gas or oil production. It should be noted that the corresponding drive devices optionally have to be replaced or serviced underneath sea level or even on the ocean bed by telecontrolled vehicles or manually, which is time-consuming and expensive with bulky drive devices. Furthermore, it should be noted that one has to take into account the heat development of the normally large driving motors, in some cases necessitating separate cooling devices for the drive devices even if they are arranged underwater.

SUMMARY OF THE INVENTION

It is therefore an object of the invention to improve a drive device of the type mentioned in the beginning in that the same has a very compact design while offering a high performance and simultaneously a good thermal distribution within the drive device, so that separate cooling devices for carrying off the generated thermal losses are unnecessary.

This object is achieved by the features of claim 1.

The invention is in particular characterized in that a plurality of relatively small driving motors can be employed which generate the necessary power but which permit, on the one hand, a compact construction of the drive device and, on the other hand, permit a good thermal distribution due to their distributed arrangement. Due to this thermal distribution, no separate cooling measures for the drive device are necessary, so that an adequate cooling is given only by the heat dissipation to the environment.

In order to correspondingly connect the plurality of driving motors with the drive train, at least one essentially disk- or wheel-shaped revolution introducing device is provided which is actively connected with at least two drive shafts rotated by separate driving motors.

That means that instead of a large high-performance motor driving a disk- or wheel-shaped revolution introducing device, the same is driven by two drive shafts and by two or more driving motors having a correspondingly lower performance and also a power loss generating less heat.

The driving motors can be arranged relatively to the revolution introducing device such that the drive device altogether has a compact design. Due to the driving motors being smaller according to the invention, clearances existing in the drive device can be used which could not have been used hitherto by the larger high-performance driving motors. This makes superfluous possible modifications in the construction of the drive devices, it having to be noted that these drive devices with their corresponding housing have to be inserted into and connected with the devices to be actuated. With a correspondingly compact design of the drive device, it is easier to mount, insert and fix them at corresponding places of the device to be actuated. As just in the field of gas or oil production, various devices, such as valve, throttle, blow-out preventors or the like, are arranged in stacks one upon or next to the other, these compact drive devices facilitate the accessibility to the various devices to be actuated as well as the mounting of the drive device, in an embodiment of a simple construction, the revolution introducing device can comprise an external toothing connected with the drive shafts at places spaced apart in the peripheral direction of the device. Depending on the space available in the drive device or the corresponding housing, the driven shafts can be arranged, for example, oppositely, i.e. spaced apart by 180°, or they can be spaced apart by another angle, such as 90°. In case of three, four or more driven shafts, the corresponding distance angle can be 120°, 90° etc.

It is also possible that instead of a connection of, for example, four drive shafts with one revolution introducing device, two drive shafts each are in connection with two spaced revolution introducing devices. In this manner, at different places of the drive train, a revolution is introduced by two drive shafts each.

A simple possibility of transmitting the revolution of the drive shafts to the revolution introducing device can be seen in that the revolution introducing device is designed as a worm wheel and one worm is arranged on each drive shaft. Depending on the design of the corresponding external toothing, combinations of cylinder worm/globoid worm wheel, enveloping worm/spur wheel or enveloping worm/globoid worm wheel are possible.

In order to simply mount and drive the corresponding drive shafts, the worm can be arranged essentially centrically on a drive shaft driven at both sides by motors.

It is possible to form the worm integrally with the drive shaft by forming a certain area of the drive shaft as worm. However, for possibly realizing variations with respect to the arrangement of the worm on the drive shaft in a simple manner, the worm can be placed on the drive shaft in particular in a detachable fashion.

It is possible that, for example, two driving motors each having one drive shaft are arranged such that the corresponding worm is arranged between facing ends of the drive shafts and connected with both drive shafts. It is also possible that the drive shaft has a one-piece design and one motor, in particular an electromotor, is assigned to each of its ends. The drive shaft can simultaneously form the motor shaft by projecting into the corresponding driving motors.

In order to permit a slender design of the drive device, the drive shaft can be arranged perpendicularly to the longitudinal direction of the operating element Correspondingly, the drive train, too, essentially extends into this longitudinal direction.

In order to form the drive device with a similarly compact design and a plurality of employed driving motors having higher efficiencies and to possibly even reduce the structural volume of the drive device, for forming a double helical gearing, the revolution introducing device can be formed as helical gear spur wheel and a helical gear drive wheel can be arranged on each drive shaft. Due to this double helical gearing, there are in particular no axial forces and in contradiction to the worm gear pair there is a linear contact between the corresponding teeth of spur wheel and drive wheel. Moreover, such a double helical gearing has a high life expectancy, a high reliability, a low wear and a simple construction. The efficiency can be easily up to 85%.

Even in case of an arrangement of a plurality of drive shafts with corresponding helical gear drive wheels, only one helical gear spur wheel is necessary if the corresponding drive wheels are spaced in the peripheral direction of the spur wheel. In this manner, too, it is possible to use, for example, two, three or even four drive wheels with only one spur wheel.

In order to further increase the performance of the drive device or to obtain a redundancy with respect to the driving motors, at least two driving motors can be assigned to the ends of the drive shaft. It is also possible that instead of an arrangement of one driving motor each at one end, at least two driving motors are arranged at only one end of the drive shaft.

Of course, it is also possible to use three, four or more driving motors.

In order to optionally reduce the speed correspondingly generated by the driving motors, a step-down gear unit, in particular a so-called harmonic drive, can be arranged between the motor and the helical gear drive wheel as a transmission changing device. Such a harmonic drive normally consists of three parts. The first part is a generally fixed ring with an internal toothing. The second part is a flexible, cup-shaped shell with an external toothing being engaged with the internal toothing of the fixed ring. The external toothing of the shell and the internal toothing of the ring are engaged by means of the third component, the wave generator, which deflects opposite areas of the flexible shell, such that essentially only an engagement of the corresponding teeth is effected in these deflected areas.

It is possible in particular with the double helical gearings to arrange the drive shaft in parallel to the longitudinal direction of the operating element.

In particular in case of the driving motors being arranged at only one end of the drive shaft, the construction of the drive device can be further simplified if the drive shaft is optionally mounted at the other end in a floating fashion.

In order to determine the adjustment of the operating element via the drive device, for example, a positioning sensor can be assigned to the revolution introducing device which detects the corresponding rotational position of the device. Via the angle of rotation, a rotation or a linear adjustment of the operating element can then be calculated. It is also possible to alternatively or additionally assign the positioning sensor to other parts of the drive device, such as, for example, to the worm, the helical gear drive wheel, one of the driving motors or the like.

If a further speed reduction or increase is desired with the drive device, the drive train can comprise a rotating spindle and/or a recirculating ball nut and/or a further step-down gear unit downstream of the revolution introducing device.

By combining the rotating spindle and the recirculating ball nut, it is possible, for example, to convert the revolution of the electromotors into a linear motion in a simple manner, so that this combination of rotating spindle/recirculating ball nut realizes a revolution/linear motion converter.

As according to the invention at least two or even more drive shafts are used for simultaneously rotating or driving the operating element, a corresponding synchronization of the revolution is advantageous. It can be effected in different ways. Synchronization can be easily realized, for example, by a mechanical coupling device with sprocket belts, chains or the like, which forcibly couple the various drive shafts. Another possibility of synchronization is that the driving motors designed as electromotors are electrically synchronized, for example by a master-slave circuit.

In order to avoid that the drive device permits an automatic adjustment of the operating element in case of a possible failure of the power supply of the corresponding driving motors, the gears of worm wheel/worm and double helical gearing can be self-locking. In this case, the double helical gearing has the further advantage that in case of transmissions of less than 25 and even less than 1, self-locking is still possible. Moreover, a corresponding brake or self-locking extent is even higher with the double helical gearing than with the worm gear pair.

With respect to the double helical gearing, the construction thereof can be further simplified by reducing, for example, the number of teeth down to one tooth each, the number of teeth depending on the helical angle of the teeth. For example, for the helical angle ranges of 40° to 85° and in particular 60° to 80° can be used.

With respect to the mechanical coupling device, it also has to be noted that the same can also synchronize drive shafts, only one of which is, for example, driven by one or several corresponding motors. The corresponding driving power is then also transmitted to the other drive shafts having no own drive via the mechanical coupling device. The mechanical coupling device can be arranged at an adequate place of the drive shaft, it being possible for such an arrangement, for example, to be arranged, in case of the drive shafts with a worm gear pair, adjacent to the worms or adjacent to ends or at ends of the drive shafts. Furthermore, with the mechanical coupling device it should be noted that thereby also the self-braking or self-locking of the corresponding gear units can be transmitted to all drive shafts, so that, for example, the arrangement of a self-braking or self-locking gear unit between rotating spindle and one of the drive shafts is sufficient.

Together with the mechanical coupling device, in a further embodiment of the invention it is possible to dispense with a gear unit between the rotating spindle and one or all of the drive shafts, it being possible for the driving power to be transmitted in this connection by the mechanical coupling device, i.e. the essentially disk- or wheel-shaped revolution introducing device can be actively connected with the mechanical coupling device. In a corresponding design of the mechanical coupling device, the same can correspondingly also be self-braking or self-locking.

For realizing the mechanical coupling device, various embodiments are possible. In one embodiment, a corresponding pinion is movably connected with the other pinions on each of the drive shafts by means of a chain or a sprocket belt. It is furthermore possible for the pinions of the drive shafts to be in engagement with a gear rim mounted in the housing, the mechanical coupling and synchronization being effected thereby. In another embodiment of the mechanical coupling device, the same can be formed by a gear wheel set or the like.

It is obvious that various combinations of mechanical coupling device, number of drive shafts, number and arrangement of the self-locking gear unit etc. are possible.

BRIEF DESCRIPTION OF THE DRAWINGS

In the following, advantageous embodiments of the invention are illustrated more in detail with reference to the Figures enclosed in the drawing.

in the drawings.

DESCRIPTION OF THE PREFERRED EMBODIMENTS

Figure 1:
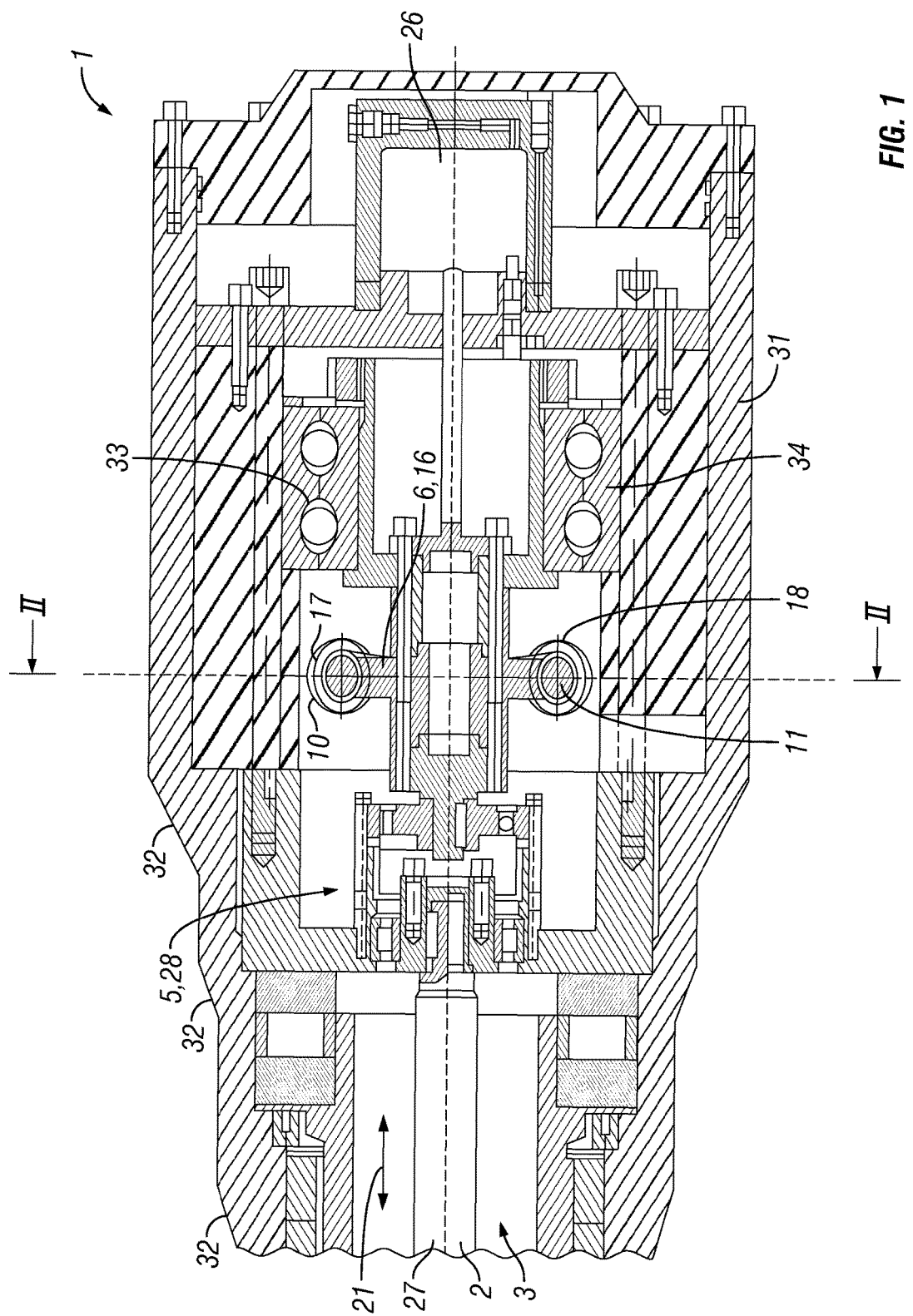
FIG. 1 shows a longitudinal section through an embodiment of a drive device 1 according to the invention, the longitudinal section corresponding to a section along line I-I of FIG. 2.

FIG. 1 shows a longitudinal section through an embodiment of a drive device 1 according to the invention.

For simplification, only a part of a corresponding operating element 2 and a rotating spindle 27 connected to such an operating element, respectively, is depicted. Moreover, for simplification, corresponding devices, in particular of the gas or oil production, such as valves, throttles, blow-out preventors or the like, in which the operating element triggers a corresponding activity, such as opening and closing the valve, changes in the throttling or the like, are not depicted.

The drive device 1 has an essentially cylindrical housing 31, the cross-section of which is reduced in degrees towards the operating element 2 by correspondingly skewed fitting surfaces 32. These three fitting surfaces 32 and the cross-sectional reduction facilitate an insertion of the device housing into a corresponding device underneath sea level, on the ocean bed or in other impracticable areas, in particular by telecontrolled vehicles.

Figure 2:
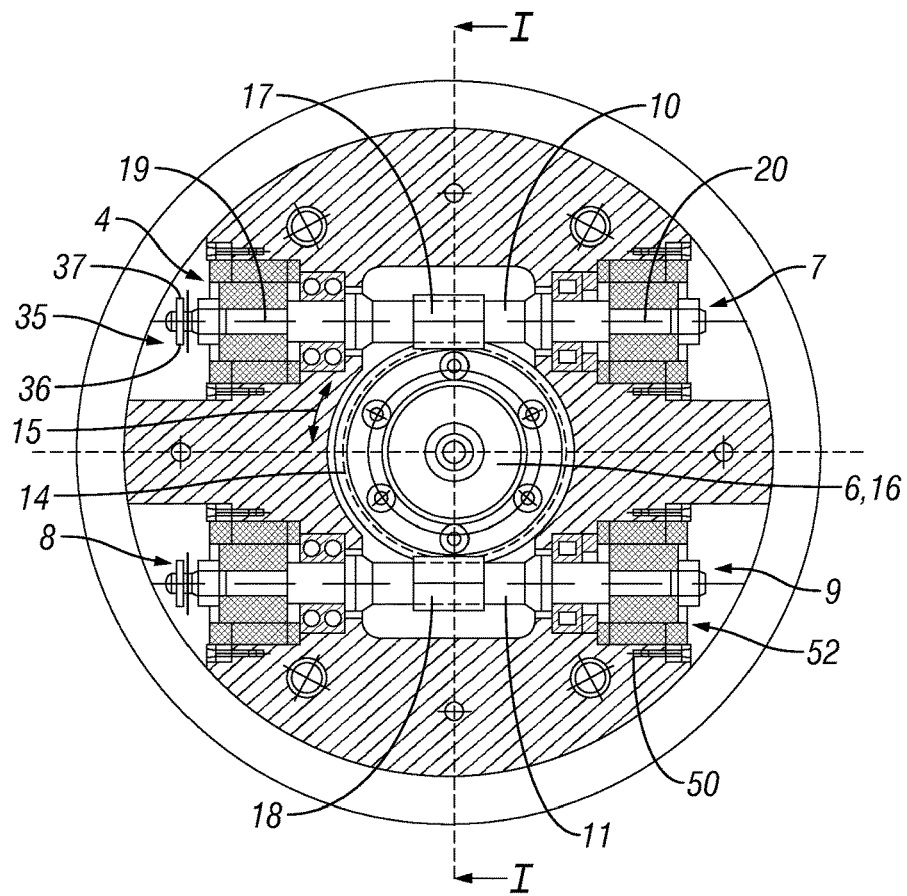
FIG. 2 shows a section along line II-II of FIG. 1.

A drive train 3 connecting the operating element 2, 27 with driving motors 4, 7, 8, 9, see FIG. 2, is arranged within the device housing 31. In the shown embodiment according to FIG. 1, it comprises, for example, the rotating spindle 27, a gear transmission unit 28 designed as harmonic drive, a transmission changing unit 5, an essentially disk- or wheel-shaped revolution introducing device 6, and the further driving connections to the driving motors 4, 7, 8, 9, see in particular FIG. 2 and the further embodiment according to FIG. 3.

With respect to the rotating spindle 27, it should be noted that in the represented embodiment it is mounted rotatably but axially stationarily. It is also possible to produce a motion connection to a recirculating ball nut instead of a motion connection to the rotating spindle 27 with the step-down gear unit 28, the recirculating ball nut being mounted rotatably, but axially stationarily, so that the rotating spindle 27 would be correspondingly adjustable in the axial direction. Further possibilities, in particular for the connection of the step-down gear unit 28 with a corresponding operating element 2, can be considered.

The step-down gear unit 28 designed as harmonic drive is employed such that the flexible, cup-shaped shell of the harmonic drive is connected to the rotating spindle 27, and the wave generator of the harmonic drive is connected to the revolution introducing device 6. The other part of the harmonic drive, the fixed ring with internal toothing, serves for rolling off the cup-shaped shell provided with a corresponding external toothing, the wave generator pressing essentially opposing areas of the shell into engagement with the internal toothing of the fixed ring.

The revolution introducing device 6 is disk- or wheel-shaped and formed with an external toothing 14 arranged along its peripheral direction 15, see FIG. 2. In the embodiment according to FIGS. 1 and 2, the revolution introducing device 6 is designed as worm wheel 16 which is in engagement with corresponding worms 17, 18 and their external toothing. The worms 17, 18 are in abutment at essentially opposing places of the worm wheel 16 and are arranged on corresponding drive shafts 10, 11.

The worm wheel 16 is rotatably mounted relatively to the device housing 31 via pivot bearings 33, 34. Furthermore, a positioning sensor 26 is assigned to one end of the drive train 3, which can in particular detect the angle of rotation of the drive train or the worm wheel 16, respectively, and convert it into a rotation or a linear adjustment, respectively, of the operating element 2.

FIG. 2 corresponds to a section along line II-II of FIG. 1, identical parts being provided with identical reference numerals in this as well as in the other Figures and reference being partially made to the respective other Figures for describing the corresponding characterized parts.

In FIG. 2 corresponding to a section along line II-II of FIG. 1, one can see in particular that two different drive shafts 10, 11 are arranged at both sides of the worm wheel 16 and drive the same via corresponding worms 17, 18. Each of the drive shafts 10, 11 comprises driving motors 4, 7, and 8, 9, respectively, at their opposite ends 19, 20. Directly adjacent to the driving motors, the drive shafts 10, 11 are each rotatably mounted and essentially integral with the motor shafts.

Figure 3:
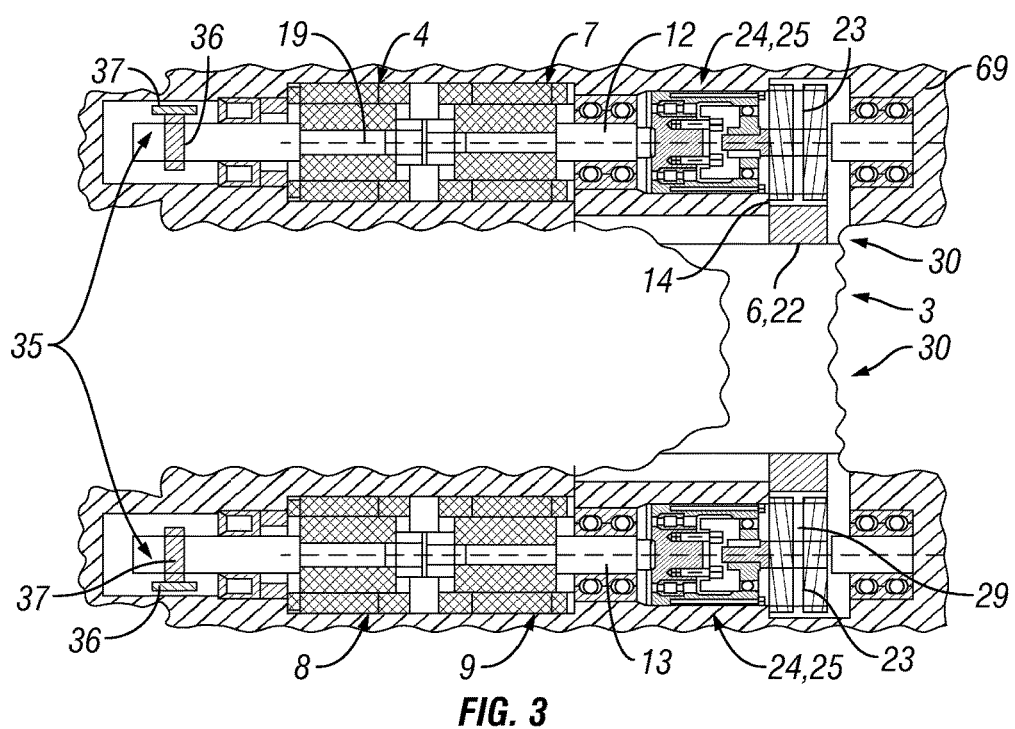
FIG. 3 shows a simplified representation of a second embodiment of the drive device according to the invention with double helical gearing.

It is also possible for the drive shafts to be mounted in a floating fashion, also see the further embodiment according to FIG. 3.

It is furthermore possible for further drive shafts to be arranged which are correspondingly in motion connection with the worm wheel 16 or another worm wheel offset in parallel thereto. Further driving motors/drive shafts are assigned to this additional worm/drive wheel, too.

For synchronizing the various drive shafts, on the one hand, an electrical synchronization of the electromotors 4, 7, and 8, 9, and on the other hand, an essentially mechanical synchronization of the drive shafts 10, 11, can be effected directly with one another by means of non-depicted sprocket belts, chains, or the like.

In the embodiment according to FIGS. 1 and 2, it should be noted that the corresponding drive shafts 10, 11, are essentially oriented perpendicular to the longitudinal direction 21 of the operating element 2 or the rotating spindle 27, respectively.

In the further embodiment according to FIG. 3 corresponding to a simplified view according to FIG. 1, the revolution introducing device 6 is designed as helical gear spur wheel 22. Otherwise, the design of the drive train can be constructed analogously to FIG. 1.

The helical gear spur wheel 22 forms a part of a dually arranged double helical gearing 30, one double helical gearing 30 each being formed by a helical gear spur wheel 22 and a helical gear drive wheel 23 in engagement there-with. One of these drive wheels 23 each is actively connected with a corresponding drive shaft 12 or 13, respectively.

The drive shafts 12, 13 according to FIG. 3 are rotatably mounted at both ends in the device housing and at one end two driving motors 4, 7, and 8, 9, respectively, are assigned to each of the drive shafts 12, 13. Between the driving motors 4, 7, and 8, 9, respectively, of each drive shaft 12, 13 and the corresponding drive wheel 23, a step-down gear unit 24 designed as harmonic drive 25 is arranged. In this drive, the flexible, cup-shaped shell is actively connected with the respective drive shaft and the wave generator is connected with the drive wheel 23.

In the embodiment according to FIG. 3, too, it is possible to arrange three, four, or even more drive shafts in the peripheral direction in a spaced manner around the spur wheel 22 as revolution introducing device 6, correspondingly all drive wheels 23 being engaged with the spur wheel 22. It is also possible to arrange two of the helical gear spur wheels offset in parallel to one another and to connect them with two, three, or even more drive wheels.

It should be finally noted that of course also a combination of the embodiments according to FIG. 1, 2 or 3, respectively, is possible, so that a worm gear pair according to FIG. 1 or 2, respectively, and a double helical gearing 30 according to FIG. 3 are employed together for one drive train 3. The helical angle of the gearing is between 40° and 85°, preferably between 60° and 80°.

The assignment of two or even more driving motors, which are preferably designed as electromotors, to each drive shaft permits a redundancy with respect to the motors and furthermore the use of smaller electromotors having less power, the plurality of motors generating the corresponding power for the adjustment of the operating element 2. The various driving motors are distributed in the device housing 31, so that correspondingly the generated lost heat in the housing is also distributed. This makes superfluous separate cooling devices, and instead, the corresponding lost heat can be carried off via the environment. With respect to the two employed gears, worm gear pair and double helical gearing, it should be noted that these are self-locking, so that an automatic rotation of the gears in particular opposed to the sense of rotation transmitted by the electromotors, is avoided. In the double helical gearing 30 according to FIG. 3, furthermore a self-braking option is realized on the driving end of the corresponding gear.

The drive shafts 10, 11 or 12, 13 may be synchronized by a mechanical coupling device 35. The coupling device comprises e.g. a pinion 36 on each of the drive shafts 10, 11, or 12, 13, respectively, and a chain 37 or a corresponding sprocket belt, respectively, connecting the motion of the various pinions. It is furthermore possible for a gear rim to be also mounted in the housing with which all pinions are engaged for forming a mechanical coupling device.

It is finally also possible that the coupling device 35 is formed by a gear wheel set.

The mechanical coupling device 35 makes it possible, for example, to also transmit the self-braking or self-locking effect by the corresponding gear units, see worm gear pair and double helical gearing in FIGS. 2 and 3, for example, from a drive shaft which is self-braked or self-locked by such a gear unit to the other drive shafts. The transmission can also be employed for the driving power, so that with a drive of only one of the drive shafts directly by motors, the driving power can be transmitted to all other drive shafts via the mechanical coupling device.

If the corresponding disk- or wheel-shaped revolution introducing device of the drive train is directly actively connected with the mechanical coupling device, in a further embodiment of the invention it is possible to completely dispense with the self-braking or self-locking gear unit, so that the driving power can be transmitted to the rotating spindle by the mechanical coupling device and the same is correspondingly designed to offer at least a certain degree of self-braking and self-locking effects.

Corresponding combinations of mechanical coupling device, number of drive shafts, drive of the drive shafts by one or a plurality of motors, arrangement and number of gear units are possible.

The invention claimed is:

1. Drive device for adjusting an operating element in a component used in the field of gas or oil exploitation and/or production, comprising:
  driving motors;
  a drive train actively connecting the operating element with the driving motors, the drive train comprising:
    at least two drive shafts, each drive shaft comprising two driving motors and a helical gear drive wheel arranged on the drive shaft;
    at least one transmission changing unit for converting a revolution of the driving motors into a revolution of the operating element, wherein the at least one transmission changing unit comprises a step-down gear unit comprising a harmonic drive located between one of the driving motors and one of the helical gear drive wheels; and
    a helical gear spur wheel connected to each helical gear drive wheel arranged on the drive shafts.

2. Drive device according to claim 1, wherein the helical gear spur wheel/helical gear drive wheel comprise gears that are self-locking.

3. Drive device according to claim 1, characterized in that a helical angle of the teeth of the helical gearing is between 40° and 85°.

4. Drive device according to claim 1, wherein at least two driving motors are assigned to each drive shaft at one end.

5. Drive device according to claim 1, wherein the drive shafts are arranged in parallel to the longitudinal direction of the operating element.

6. Drive device according to claim 1, wherein the drive shafts are mounted in a floating fashion.

7. Drive device according to claim 1, characterized in that a helical angle of the teeth of the helical gearing is between 60° and 80°.

* * * * *